(12) United States Patent
Son (10) Patent No.: US 8,107,172 B2
(45) Date of Patent: Jan. 31, 2012

(54) SINGLE-LENS OPTICAL SYSTEM

(75) Inventor: Ju-hwa Son, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 0 days.

(21) Appl. No.: 12/751,450

(22) Filed: Mar. 31, 2010

(65) Prior Publication Data

US 2011/0026139 A1 Feb. 3, 2011

(30) Foreign Application Priority Data

Jul. 29, 2009 (KR) .................. 10-2009-0069500

(51) Int. Cl.
*G02B 3/02* (2006.01)
*G02B 13/18* (2006.01)
*G02B 9/08* (2006.01)

(52) U.S. Cl. ............. 359/718; 359/719; 359/739
(58) Field of Classification Search ............... 359/718, 359/719, 739
See application file for complete search history.

(56) References Cited

U.S. PATENT DOCUMENTS

| 6,995,928 B2 * | 2/2006 | Saito | 359/718 |
| 2007/0279766 A1 * | 12/2007 | Ishizuka | 359/718 |

FOREIGN PATENT DOCUMENTS

| JP | 8-146290 A | 6/1996 |
| JP | 10-73759 A | 3/1998 |
| KR | 10-2005-0119831 A | 12/2005 |

* cited by examiner

*Primary Examiner* — Evelyn A. Lester
(74) *Attorney, Agent, or Firm* — Sughrue Mion, PLLC (57) ABSTRACT

A single-lens optical system including a stop and a lens sequentially arranged from an object side, and reducing distortion by controlling a distance between the stop and the lens.

10 Claims, 6 Drawing Sheets

SINGLE-LENS OPTICAL SYSTEM

CROSS-REFERENCE TO RELATED PATENT APPLICATION

This application claims priority from Korean Patent Application No. 10-2009-69500, filed on Jul. 29, 2009, in the Korean Intellectual Property Office, the disclosure of which is incorporated herein in its entirety by reference.

BACKGROUND

1. Field of the Invention

Apparatuses consistent with the present inventive concept relate to a small single-lens optical system capable of reducing distortion.

2. Description of the Related Art

Currently, digital cameras or video cameras having a solid-state imaging device such as a charge-coupled device (CCD) or a complementary metal-oxide semiconductor (CMOS) are widely spread. In particular, camera modules of mega-pixel levels are demanded, and high-definition digital cameras of five million pixels or above are released as basic models. An optical device using an imaging device such as a CCD or a CMOS, e.g., a digital camera or a mobile camera phone, is required to be small, light, and inexpensive. Furthermore, a camera used in, for example, a mobile camera phone, a computer, a black box of a car, a rear-view camera of a car, is mainly required to be small. For a small-size and light-weight camera, a lens optical system formed with one or two lenses is used.

The lens optical system has many aberration problems such as spherical aberration, astigmatic field curvature, distortion, field curvature, and coma aberration, among which correction of distortion is important.

SUMMARY

One or more exemplary embodiments provide a single-lens optical system capable of correcting distortion.

According to an aspect of an exemplary embodiment, there is provided a single-lens optical system including a stop and a lens sequentially arranged from an object side, the lens and the stop satisfying $0.1 EFL \leq L \leq 0.3 EFL$ and $|K| \geq 100$, where L represents a distance between the stop and the lens, EFL represents a focal length of the single-lens optical system, and K represents a conic constant of an image side surface of the lens.

The lens may be configured to defocus an image with respect to a paraxial image plane in forming the image.

The lens may be configured to defocus the image with respect to the paraxial image plane by 1/20 EFL or more.

The lens may have two aspherical surfaces.

An Abbe number of the lens may be equal to or greater than 55.

The lens may be a biconvex lens.

A vignette effect may be provided from an upper side of an object side surface of the lens.

The lens may be formed of glass.

The lens may have a positive refractive power.

BRIEF DESCRIPTION OF THE DRAWINGS

The above and other aspects of the present inventive concept will become more apparent by describing in detail exemplary embodiments thereof with reference to the attached drawings, in which.

DETAILED DESCRIPTION OF EXEMPLARY EMBODIMENTS

Hereinafter, the present inventive concept will be described in detail by explaining exemplary embodiments with reference to the attached drawings.

Figure 1:
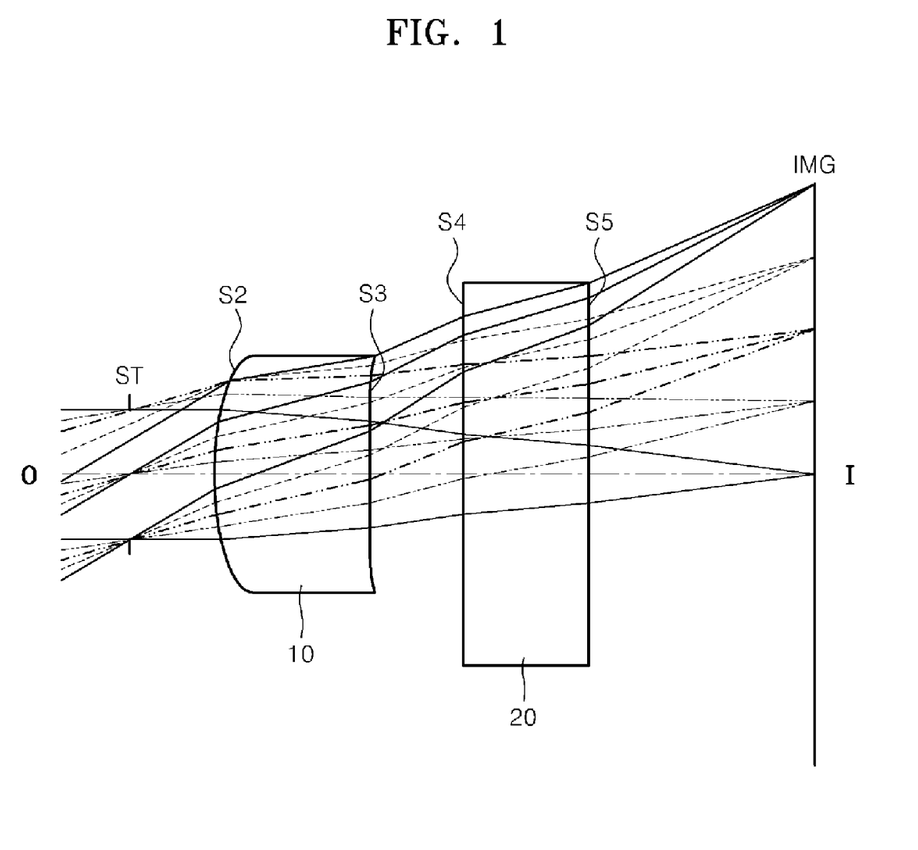
FIG. 1 is a diagram of a single-lens optical system according to a first exemplary embodiment of the present invention.

FIG. 1 is a diagram of a single-lens optical system according to an exemplary embodiment. The single-lens optical system includes a stop ST and a lens 10 sequentially arranged from an object side O.

The lens 10 may have a positive refractive power and may have two aspherical surfaces, that is, a first surface S2 and a second surface S3. In the lens 10, the first surface S2 at the object side O and the second surface S3 at an image side I may be convex. That is, the lens 10 may be a biconvex lens in which the first surface S2 is convex toward the object side O and the second surface S3 is convex toward the image side I. Distortion may be reduced as the lens 10 is formed as a biconvex lens. An infrared filter 20 may be included at the image side I of the lens 10.

The lens 10 may be formed of plastic or glass. If the lens 10 is formed of glass, a reflow method that melts solder cream coated on a surface of a printed circuit board (PCB) at a high temperature and bonds a camera module on the PCB may be used. A process for bonding a camera module on a PCB may be simplified as a reflow method is used in a product including the camera module, and thus, mass production may be greatly increased.

The single-lens optical system according to the exemplary embodiment satisfies Formula 1.

$0.1 EFL \leq L \leq 0.3 EFL$ [Formula 1]

Here, L represents a distance between the stop ST and the lens 10, and EFL represents a focal length of the single-lens optical system. The distance L between the stop ST and the lens 10 represents a distance from the stop ST to an object side surface of the lens 10, i.e., the first surface S2 of the lens 10. Distortion may be reduced as the distance L between the stop ST and the lens 10 satisfies Formula 1.

Also, the lens 10 may satisfy Formula 2.

$|K| \geq 100$ [Formula 2]

Here, K represents a conic constant of an image side surface of the lens 10, i.e., the second surface S3 of the lens 10. Optical performance may be improved as the absolute value of the conic constant K is equal to or greater than 100. For example, the optical performance may comprise sharpness and resolution.

The lens 10 defocuses an image with respect to a paraxial image plane to form the image. In a general optical system, an image is formed on a paraxial image plane so as to reduce spherical aberration. However, the single-lens optical system may not easily correct distortion. In order to correct distortion, the single-lens optical system does not form an image on the paraxial image plane, and instead, defocuses the image with respect to the paraxial image plane in forming the image. For example, the lens 10 may be configured to defocus an image with respect to the paraxial image plane by ¹/₂₀ EFL or more. If the lens 10 is configured to defocus the image with respect to the paraxial image plane, spherical aberration may occur, but instead, distortion may be reduced. As such, spherical aberration and distortion are appropriately controlled in the single-lens optical system.

Chromatic aberration may be corrected as the lens 10 is formed of a material having an Abbe number equal to or greater than 55. Optical performance may be improved as a vignette effect is provided from an upper side of the object side surface of the lens 10, i.e., the first surface S2 of the lens 10.

According to an exemplary embodiment, an aspherical surface of a zoom lens is defined as described below.

The shape of an aspherical surface of a zoom lens may be represented as Formula 3 when an x-axis is an optical axis, a y-axis is an axis perpendicular to the optical axis, and a positive direction is a light proceeding direction. In Formula 3, x represents a distance from a vertex of the lens in an optical axis direction, y represents a distance in a direction perpendicular to the optical axis direction, K represents a conic constant, A, B, C, D, E, F, G, and H represent aspherical coefficients, and c represents an inverse number of a radius of curvature at the vertex of the lens (1/R).

$$x = \frac{cy^2}{1 + \sqrt{1 - (K+1)c^2 h^2}} + Ah^4 + Bh^6 + Ch^8 + Dh^{10} + Eh^{12} + Fh^{14} + Gh^{16} + Hh^{18}$$

[Formula 3]

Accordingly, miniaturization and optical performance enhancement of a single-lens optical system are realized based on various exemplary embodiments described below.

Hereinafter, TTL represents an overall length of a lens optical system, EFL represents a focal length of the lens optical system, Fno represents an F-number (or focal ratio), R represents a radius of curvature, Dn represents a distance between a stop and a lens or a central thickness of the lens, and vd represents an Abbe number. Also, ST represents the stop, OBJ represents an object plane, IMG represents an image plane, and ASP represents an aspherical surface.

First Exemplary Embodiment

FIG. 1 is a diagram of the single-lens optical system according to a first exemplary embodiment.

| | |
|---|---|
| EFL = | 1.35 mm |
| TTL = | 2.2 mm |
| Fno = | 3.2 |
| Distance between stop (ST) and Lens (L) = | 0.27 mm (20% of EFL (1.35 mm)) |
| Defocus = | 0.18 mm (13% of EFL (1.35 mm)) |

| Lens Surface | R | Dn | nd | vd |
|---|---|---|---|---|
| OBJ: | INFINITY | INFINITY | | |
| ST: | INFINITY | 0.270000 | | |
| S2: | 0.96106 | 0.500000 | 1.514 | 63.8 |

ASP:

K: 2.882426
A: −0.315377E+00      B: 0.112457E+03      C: −0.475732E+04
D: 0.935524E+05       E: −0.950156E+06     F: 0.470853E+07
G: −0.868124E+07      H: 0.000000E+00
J: 0.000000E+00

S3: −2.09202          0.300000
ASP:

K: −9999.000000
A: −0.147888E+00      B: 0.163030E+02      C: 0.589621E+02
D: −0.368890E+04      E: 0.405949E+05      F: −0.192851E+06
G: 0.349682E+06       H: 0.000000E+00      J: 0.000000E+00
S4: INFINITY 0.400000
S5: INFINITY 0.547238
IMG: INFINITY 0.180000

Figure 2:
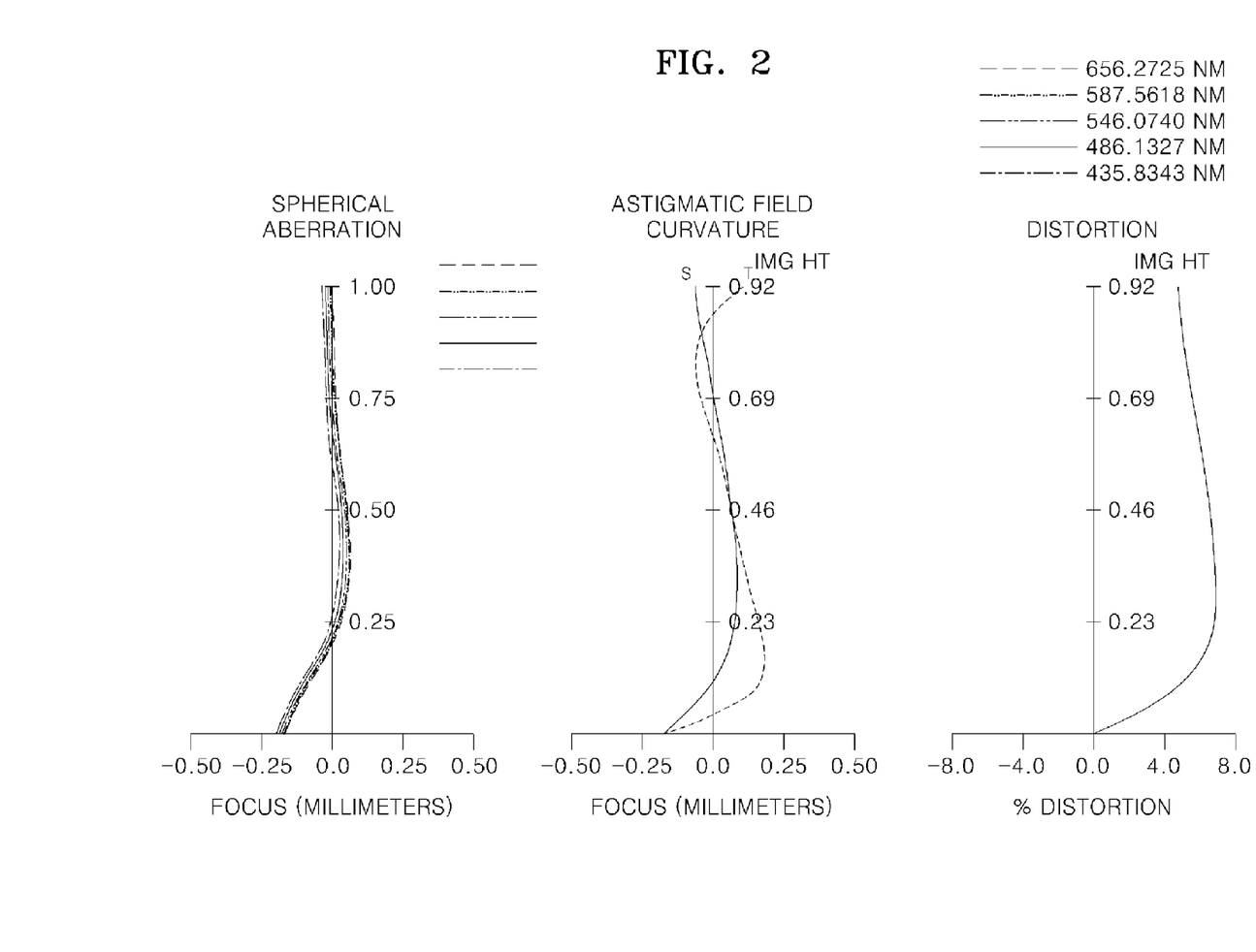
FIG. 2 illustrates graphs showing spherical aberration, astigmatic field curvature, and distortion of the single-lens optical system illustrated in FIG. 1, according to an exemplary embodiment.
Figure 3:
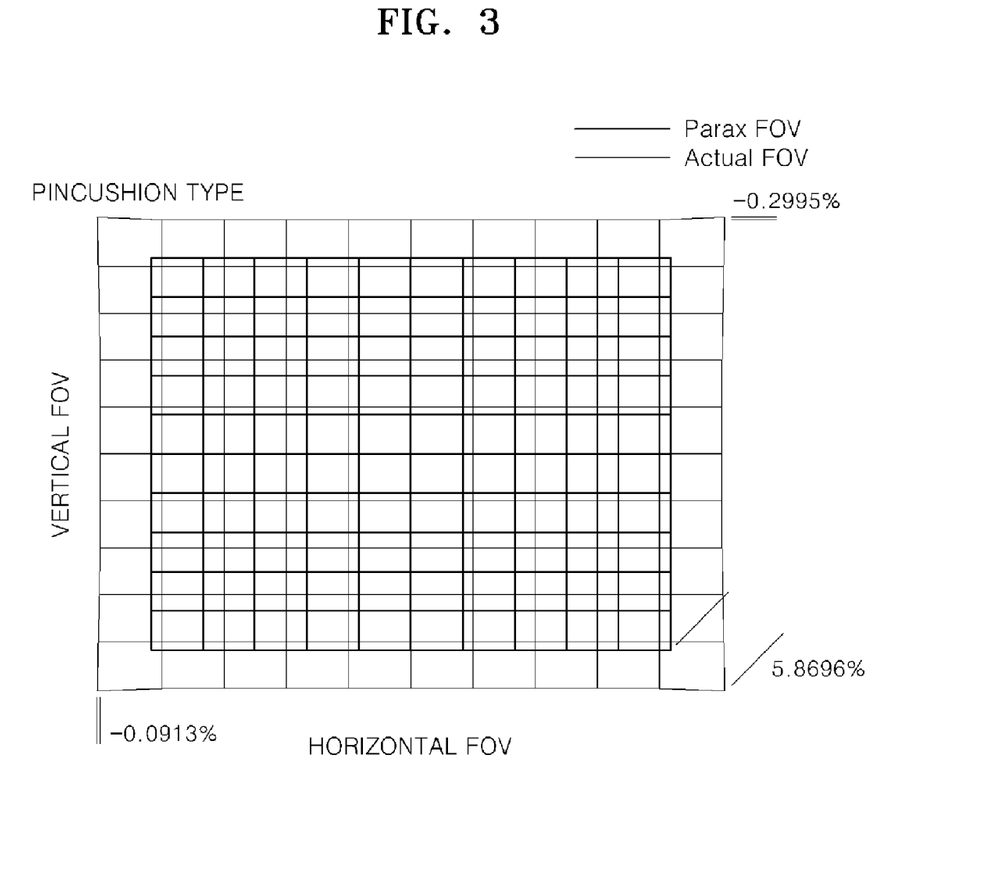
FIG. 3 is a diagram showing television (TV) distortion of the single-lens optical system illustrated in FIG. 1, according to an exemplary embodiment.

FIG. 2 illustrates graphs showing spherical aberration, astigmatic field curvature, and distortion of the single-lens optical system illustrated in FIG. 1. The spherical aberration is represented with a c-line, an e-line, and an f-line. The c-line is 656.3 nm, the e-line is 546 nm, the f-line is 486.1 nm. The astigmatic field curvature is represented with a tangential field T and a sagittal field S. In the distortion graph, a vertical axis represents an image height IMG HT. FIG. 3 is a diagram showing television (TV) distortion of the single-lens optical system illustrated in FIG. 1.

Second Exemplary Embodiment

Figure 4:
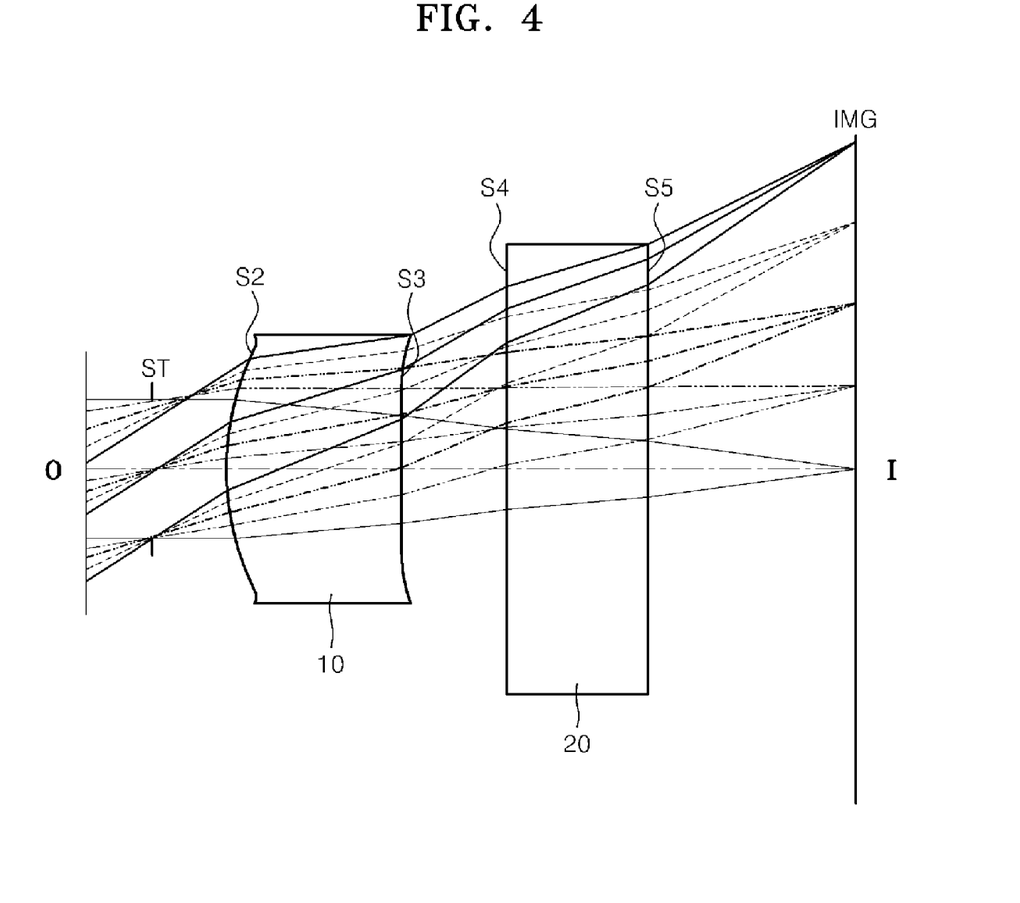
FIG. 4 is a diagram of a single-lens optical system according to a second exemplary embodiment.

FIG. 4 is a diagram of a single-lens optical system according to a second exemplary embodiment.

| | |
|---|---|
| EFL = | 1.21 mm |
| TTL = | 1.99 mm |
| Fno = | 3.15 |
| Distance between stop and Lens (L) = | 0.20 mm (16% of EFL (1.21 mm)) |
| Defocus = | 0.18 mm (14.8% of EFL (1.21 mm)) |

| Lens Surface | R | Dn | nd | vd |
|---|---|---|---|---|
| OBJ: | INFINITY | INFINITY | | |
| ST: | INFINITY | 0.200000 | | |
| S2: | 0.86624 | 0.500000 | 1.514 | 63.8 |

ASP:

K: 2.104846
A: 0.385068E−01      B: 0.957812E+302    C: −.445648E+04
D: 0.961596E+05      E: −0.110528E+07    F: 0.648243E+07
G: −0.152118E+08     H: 0.000000E+00
J: 0.000000E+00

| S3: | −1.80482 | 0.300000 |

ASP:

K: −9999.000000
A: −0.882443E−01     B: 0.264328E+02     C: −0.115487E+03
D: −0.255163E+04     E: 0.435429E+05     F: −0.260114E+06
G: 0.563302E+06      H: 0.000000E+00     J: 0.000000E+00
S5: INFINITY 0.400000
S6: INFINITY 0.408693
IMG: INFINITY 0.180000

Figure 5:
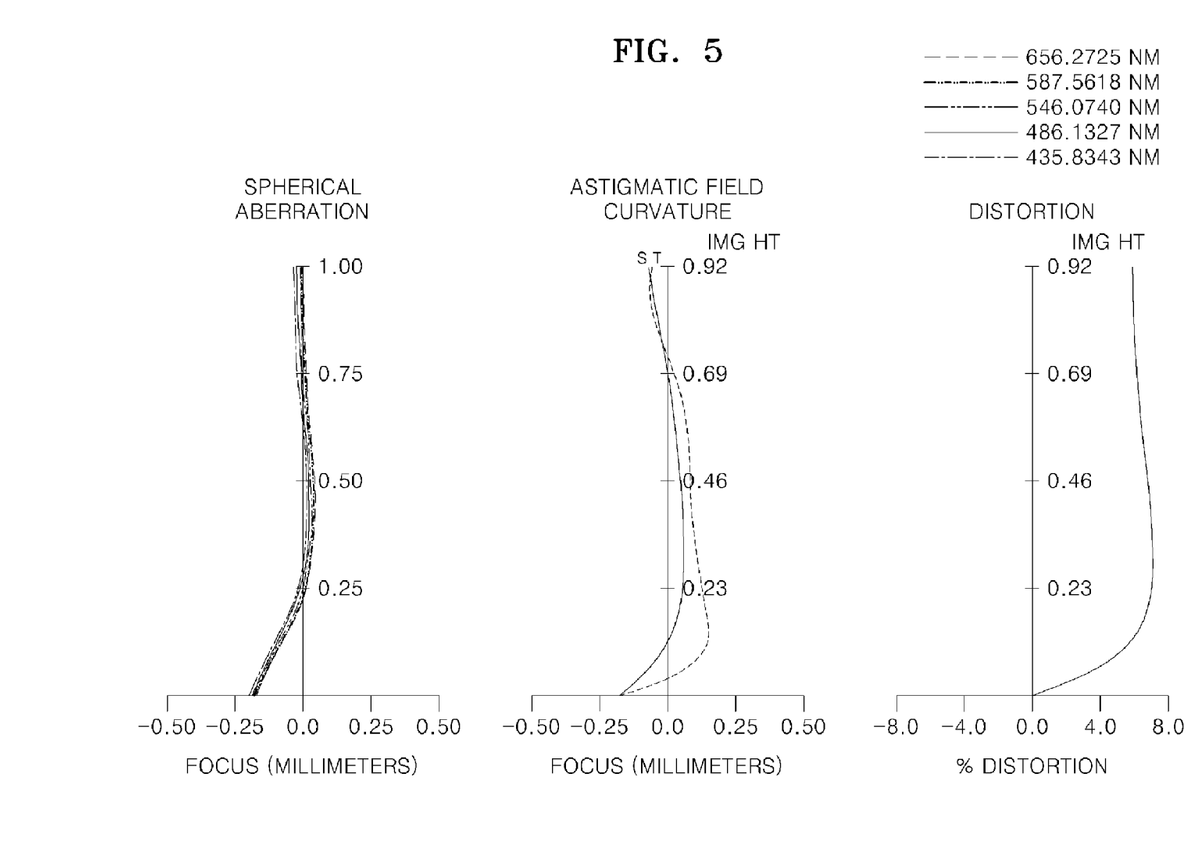
FIG. 5 illustrates graphs showing spherical aberration, astigmatic field curvature, and distortion of the single-lens optical system illustrated in FIG. 4, according to an exemplary embodiment.
Figure 6:
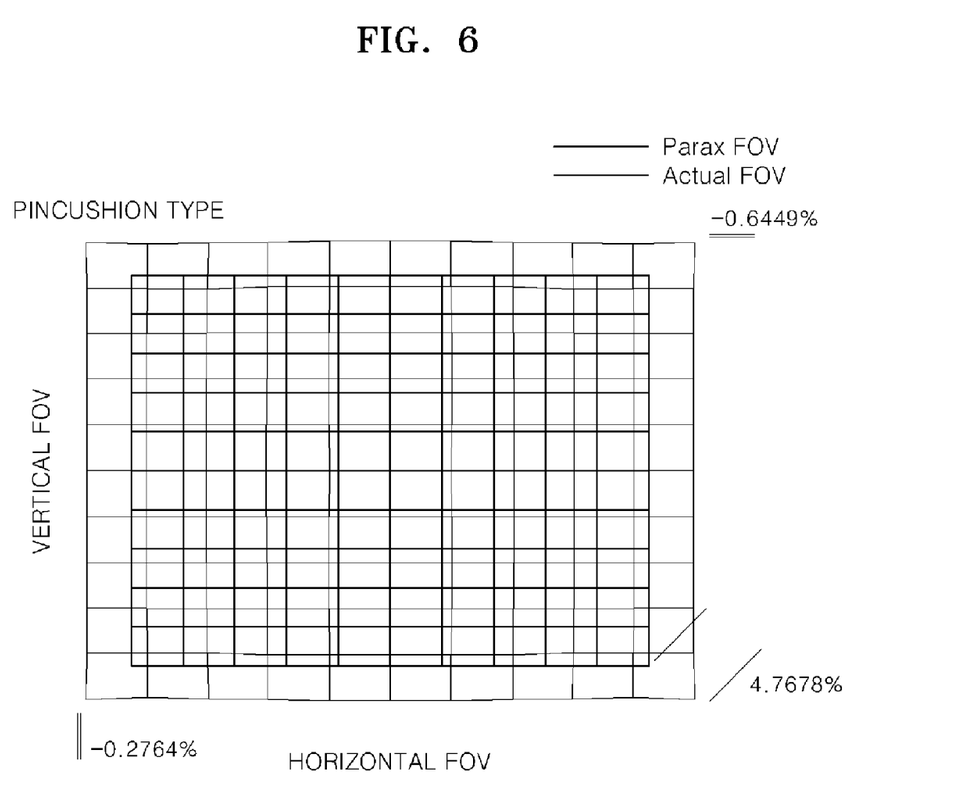
FIG. 6 is a diagram showing TV distortion of the single-lens optical system illustrated in FIG. 4, according to an exemplary embodiment.

FIG. 5 illustrates graphs showing spherical aberration, astigmatic field curvature, and distortion of the single-lens optical system illustrated in FIG. 4. FIG. 6 is a diagram showing TV distortion of the single-lens optical system illustrated in FIG. 4. As shown in FIG. 6, the TV distortion is corrected.

A single-lens optical system according to an exemplary embodiment is appropriate for visual communication requiring micro-optical devices. For example, the single-lens optical system may be used in a camera phone, a computer, a black box of a car, a rear-view camera of a car, and a closed circuit television (CCTV). In the above exemplary embodiments, a small-size optical system is realized by forming an optical system with a single lens, and distortion is reduced by controlling a distance between a stop and the single lens.

While the present inventive concept has been particularly shown and described with reference to the exemplary embodiments thereof, it will be understood by those of ordinary skill in the art that various changes in form and details may be made therein without departing from the spirit and scope of the present inventive concept as defined by the following claims.

What is claimed is:

1. A single-lens optical system comprising a stop and a lens sequentially arranged from an object side, the lens and the stop satisfying $0.1 EFL \leq L \leq 0.3 EFL$ and $|K| \geq 100$, where L represents a distance between the stop and the lens, EFL represents a focal length of the single-lens optical system, and K represents a conic constant of an image side surface of the lens; and wherein the lens is configured to defocus an image with respect to a paraxial image plane in forming the image.

2. The system of claim 1, wherein the lens is configured to defocus the image with respect to the paraxial image plane by 1/20 EFL or more.

3. The system of claim 1, wherein the lens has two aspherical surfaces.

4. The system of claim 3, wherein at least one of the two aspherical surfaces satisfies:

$$x = \frac{cy^2}{1+\sqrt{1-(K+1)c^2h^2}} + Ah^4 + Bh^6 + Ch^8 + Dh^{10} + Eh^{12} + Fh^{14} + Gh^{16} + Hh^{18},$$

where x represents a distance from a vertex of the lens in an optical axis direction, y represents a distance in a direction perpendicular to the optical axis direction, K represents a conic constant, A, B, C, D, E, F, G, and H represent aspherical coefficients, and c represents an inverse number of a radius of curvature at the vertex of the lens.

5. The system of claim 1, wherein an Abbe number of the lens is equal to or greater than 55.

6. The system of claim 1, wherein the lens is a biconvex lens.

7. The system of claim 1, wherein a vignette effect is provided from an upper side of an object side surface of the lens.

8. The system of claim 1, wherein the lens is formed of glass.

9. The system of claim 1, wherein the lens has a positive refractive power.

10. The system of claim 1, further comprising an infrared filter disposed between the lens and an image plane.

* * * * *